United States Patent [19]

Chase, Jr. et al.

[11] Patent Number: 4,951,192

[45] Date of Patent: Aug. 21, 1990

[54] DEVICE FOR MANAGING SOFTWARE CONFIGURATIONS IN PARALLEL IN A NETWORK

[75] Inventors: Robert P. Chase, Jr., Newton; Howard Spilke, Shrewsbury, both of Mass.

[73] Assignee: Apollo Computer, Inc., Chelmsford, Mass.

[21] Appl. No.: 58,330

[22] Filed: Jun. 4, 1987

[51] Int. Cl.[5] .............................................. G06F 9/44
[52] U.S. Cl. ................................ 364/200; 364/281.3; 364/281.8
[58] Field of Search ......... 364/200 MS Files, 900 MS Files, 364/300, 200, 900

[56] References Cited

U.S. PATENT DOCUMENTS

| | | | |
|---|---|---|---|
| 4,558,413 | 12/1985 | Schmidt | 364/200 |
| 4,590,557 | 5/1986 | Lillie | 364/200 |
| 4,809,170 | 2/1989 | Leblang et al. | 364/200 |

OTHER PUBLICATIONS

"The DOMAIN Software Engineering Environment for Large Scale Software Development Efforts", by David B. Leblang, Robert P. Chase, Jr. and Gordon D. McLean, Jr., *Proceedings of the IEEE Conference on Workstations*, San Jose, California, Nov. 1985, pp. 1-19.

Primary Examiner—Allen MacDonald
Assistant Examiner—Debra A. Chun
Attorney, Agent, or Firm—Hamilton, Brook, Smith, Reynolds, P.C.

[57] ABSTRACT

A software configuration management system that uses a network computing environment to build large software systems in parallel. A configuration manager assigns the compilation of buildable components of a software system to different processors in the network. Buildable components are assigned in order, according to dependencies between components, independent components taking precedence. Processors are chosen according to the amount of idle time during a sampled time segment. A display provides processor compilation status messages for each compilation discrete from status messages of other compilations. A continuously updated overall status report of the system being built is simultaneously displayed with, but segregated from, the compilation status messages.

31 Claims, 5 Drawing Sheets

| 32 | |
|---|---|
| completed "grammar.y" on BANGLES<br>yacc: no errors<br><br>completed "parser.c" on MACBETH<br>cc: line 183, bad syntax<br>cc: 1 error, compilation failed.<br><br>building "codgen.c" on BIG_BIRD<br><br>completed "macros.c" on ZEUS<br>cc: no errors, no warnings<br><br>building "objmod.c" on BANGLES<br><br>building "lexer.c" on ZEUS<br><br>34 | 20 builds required, 4 pending<br>8 completed successfully, 2 failed<br><br>6 builds are in progress:<br><br>lexer.c      on ZEUS<br>codgen.c   on BIG_BIRD<br>tables.dat  on ZAPHOD<br>objmod.c   on BANGLES<br>optimize.c on DARTH_VADER<br>peephole.c on BOOP<br><br>36 |

Fig. 5

DEVICE FOR MANAGING SOFTWARE CONFIGURATIONS IN PARALLEL IN A NETWORK

BACKGROUND OF THE INVENTION

Developments in computer hardware have steadily increased the share of computing resources available to an individual user. In the beginning, computers were single user resources. Batch systems were then developed to take better advantage of the central processing unit (CPU). Next came time-sharing systems, which allowed large numbers of users to interact with a single CPU. More recently, systems in which each workstation has its own CPU have evolved from time-sharing systems to let users continue to share files without sharing a single CPU. Current workstations have overcome the problems of distributed file systems with transparent network file systems that allow users to access both local and remote files in a uniform way.

Further development brought high performance workstations, with bit map graphic displays, and high speed local area networks. Initially, most workstations were used for computer aided design applications (i.e. CAD/CAM, MCAD, etc.). However, as the price of workstations fell and the amount of software increased, a new market was created called Computer Aided Software Engineering (CASE). Various CASE tools have various software control and management capabilities. In one kind of CASE tool, components of a software system are individually designed and the software system is constructed from its components. The larger the constructed system is, however, the longer is the amount of time required to build the system. Thus, the required build time greatly impairs productivity since the user must wait for the CASE tool, and for some systems he must wait overnight.

SUMMARY OF THE INVENTION

In the present invention, a collection of loosely connected CPU's form a network computing environment. The network makes it easy to develop software systems by utilizing the computing resources throughout the network in parallel. Individual components within a system are distributed to processors best suited for the task and processed there in parallel, thereby accomplishing more in a given amount of time.

In one embodiment of the invention, a software configuration manager determines which components of a system are to be compiled, and assigns each such buildable component to a different processor to compile such that independent components are compiled in parallel by different processors. In accordance with one aspect of the present invention, the configuration manager determines which components of a system need yet to be built by reviewing a common pool of previously compiled or derived components.

In accordance with another aspect of the invention, the configuration manager defines a user specified processor as a reference node for all processors compiling components of one system. Likewise the configuration manager defines a user-specified file system within the network as a reference file system for the processors in the network. Further, a compiler stored in a filed system of one processor may be invoked by other processors of the network to compile a component.

In one feature of the present invention, the configuration manager includes a build scheduler. For each system being built, the build scheduler orders the buildable components according to their dependencies on each other, starting with the most independent components. The build scheduler then chooses and assigns available processors to compile the buildable components in the order of more independent to less independent.

In another feature of the present invention, a user specifies an ordered list, from most powerful to least powerful, of a subset of the processors. The build scheduler chooses from the list the most powerful processor with sufficient idle time to compile the next buildable component. The build scheduler computes the idle time of each listed processor as the ratio of the difference between current idle time and a base idle time to the difference between current real time and a base real time. Further, the build scheduler computes an initial base real time and an initial base idle time before any buildable component of the system is compiled. Thereafter, the build scheduler obtains a current real time and a current idle time for each listed processor prior to choosing the processor to compile a component. Preferably, the build scheduler obtains current real times and current idle times for each processor one at a time in decreasing processor list order.

In another feature of the present invention, a display of compilation status messages for each compilation is generated only upon termination of the compilation and is shown as a separate set of messages from that of other compilations. In a preferred embodiment, each compilation has a separate output file associated with it. Further, the display provides, separate from the compilation status messages, an indication of the current overall status of the system being built. The current overall status is continuously updated by the completion and commencement of compilations by the various processors. The indications of the current overall status include the number of compilations which are pending, successful, unsuccessful, and in progress, and the total number of compilations required to build the system.

In another feature of the present invention, the compiler used for a compilation may be in a file system of a processor which is not performing the compilation. Hence, processors of the network access remote files systems to perform the compilations necessary to build a system.

BRIEF DESCRIPTION OF THE DRAWINGS

The foregoing and other objects, features and advantages of the invention will be apparent from the following more particular description of a preferred embodiment of the invention, as illustrated in the accompanying drawings. The drawings are not necessarily to scale, emphasis instead being placed upon illustrating the principles of the invention.

FIG. 5 is an illustration of a screen of compilation status messages and overall system status displayed by the present invention.

DESCRIPTION OF THE PREFERRED EMBODIMENT

In a typical CASE tool of the source code control and configuration management type, an automated configuration manager builds a software system from its components. In order to correctly build a system, the configuration manager must understand the dependencies between components of the system and the translation rules needed to translate a source component into an object module or executable image. An incremental configuration manager has knowledge of previously built components (compiled or derived objects) and only rebuilds those components for which there is no suitable derived object.

Some existing tools are the UNIX ® tool MAKE with source code provided by SCCS or RSC; MMS/CMS on VAX/VMS ®; and ALS, the ADA ® Language System. These tools fail to satisfy some important requirements when used for programming or building in the large. They do not allow many users to build different versions of the same system at the same time, sharing common derived objects whenever possible. They also do not allow a single user to build a system using many CPU's concurrently.

Figure 1:
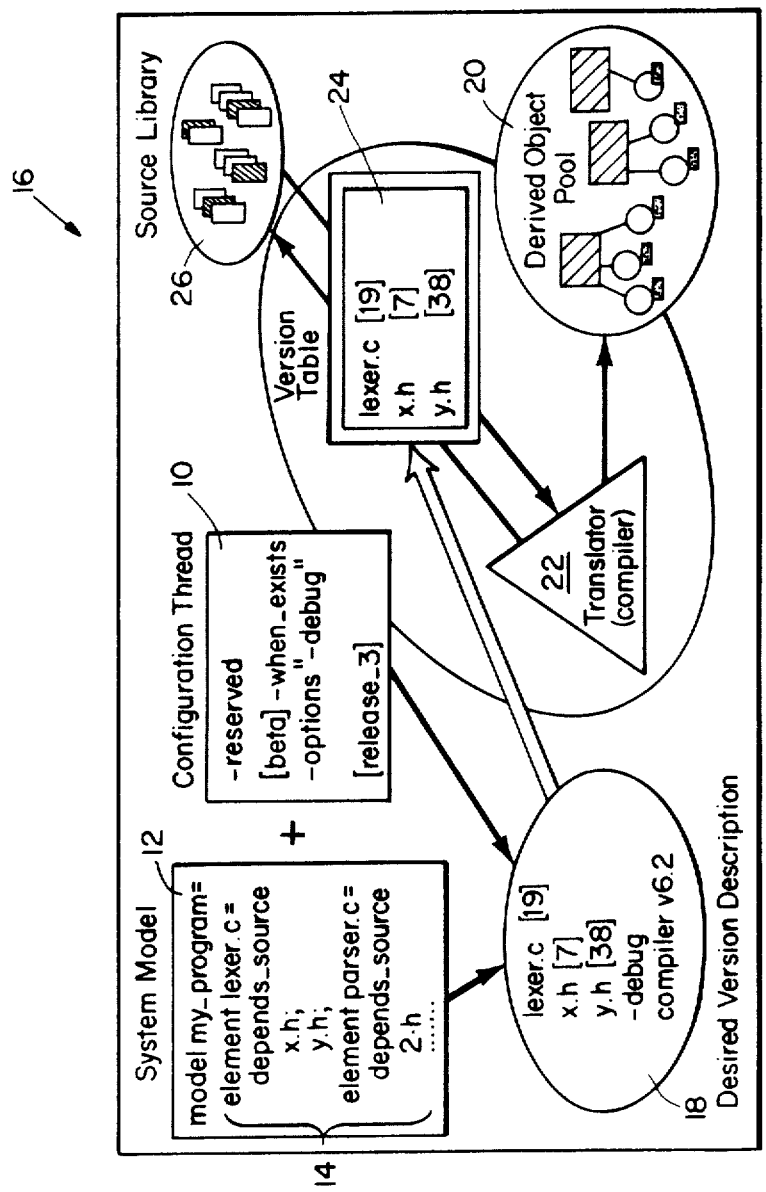
FIG. 1 is a schematic of a CASE tool employed by the present invention

The present invention employs a CASE tool which overcomes these problems of prior art devices building in the large. The CASE tool employed in the present invention is described and disclosed in "The DOMAIN Software Engineering Environment for Large Scale Software Development Efforts", by D. B. Leblang, R. P. Chase, Jr., and G. D. McLean, Jr., Proceedings of the IEEE Conference on Workstations, San Jose, Calif., November 1985; and U.S. patent application Ser. No. 725,700 filed on Apr. 22, 1985, issued as U.S. Pat. No. 4,809,170 one Feb. 28, 1989, and assigned to the assignee of the present application. Both the article and application are herein incorporated by reference. An overview of that CASE tool follows and is illustrated in FIG. 1.

A user selects a system model 12 and configuration thread 10 to describe the system he desires to build. System model 12 serves as a blueprint for the construction of the new system. The system model 12 describes the components 14 of the system, their dependencies on each other, and describes any files used by the components 14. The system model 12 contains enough information for CASE tool 16, as utilized in the present invention, to decide which components 14 can be built in parallel (i.e. at the same time on different processors).

The configuration thread 10 specifies which version of each of the components 14 should be used to build the system. The configuration thread 10 also specifies the options that should be used during translation of each component 14. The combination of the system model 12 and configuration thread 10 provides a desired version description 18 of the particular system being built.

After a user selects a system model 12 and configuration thread 10 a Configuration Manager (CM) module of the CASE tool 16 uses the desired version description 18 to search a derived object pool 20 which contains components previously compiled for other system builds by translator or compiler 22. Each derived object (compiled component) in the derived object pool 20 is tagged with the version description, translator version and options that were used to produce it. The CM searches derived object pool 20 for objects matching any component of the desired version description 18. When a match is found, the associated derived objects are re-used in the building of the current system. When a match is not found for the component of the current system, then the component is generated (built) according to the desired version description 18.

The generation of components of a system is accomplished through the translator or compiler 22 in a step called a process. For each process, a version mapping table 24 corresponding to the desired version description 18 is created for the translator 22 because the translator does not communicate with, nor have access to the desired version description 18. The translator 22 may also access other files or a source library 26, while referring to the version mapping table 24, to build or compile the described version of a component. The resulting derived objects, also known as binaries or compiled components, are tagged as previously mentioned and placed in derived object pool 20.

The derived object pool 20 may simultaneously contain several derived objects for the same buildable component. The version description distinguishes the derived objects from each other. The CM deletes objects from the pool 20 as they fall into disuse according to a user-specified limit on the number of derived objects per component. Pool objects are deleted on a least-recently-used basis as new objects are created. If a deleted derived object is subsequently needed, the CM re-derives it from its constituent element versions recorded by a history manager (HM) module.

HM provides source code control within the CASE tool 16. Using HM commands, users create source elements with unique names. Users create a new version of a source element by having the HM reserve the element during the desired modification and then subsequently replace the new version of the element. When a new version of a source element is made, the HM records only the changes made to the preceding version. Thus, HM creates a chain of changes made between sequential versions of the source element. This enables the HM to store more versions of source elements in an allotted space. The HM also supports multiple lines of development or variant branches within an element. Further, any version of a source element is directly readable from the HM source library, as will be discussed.

Figure 2:
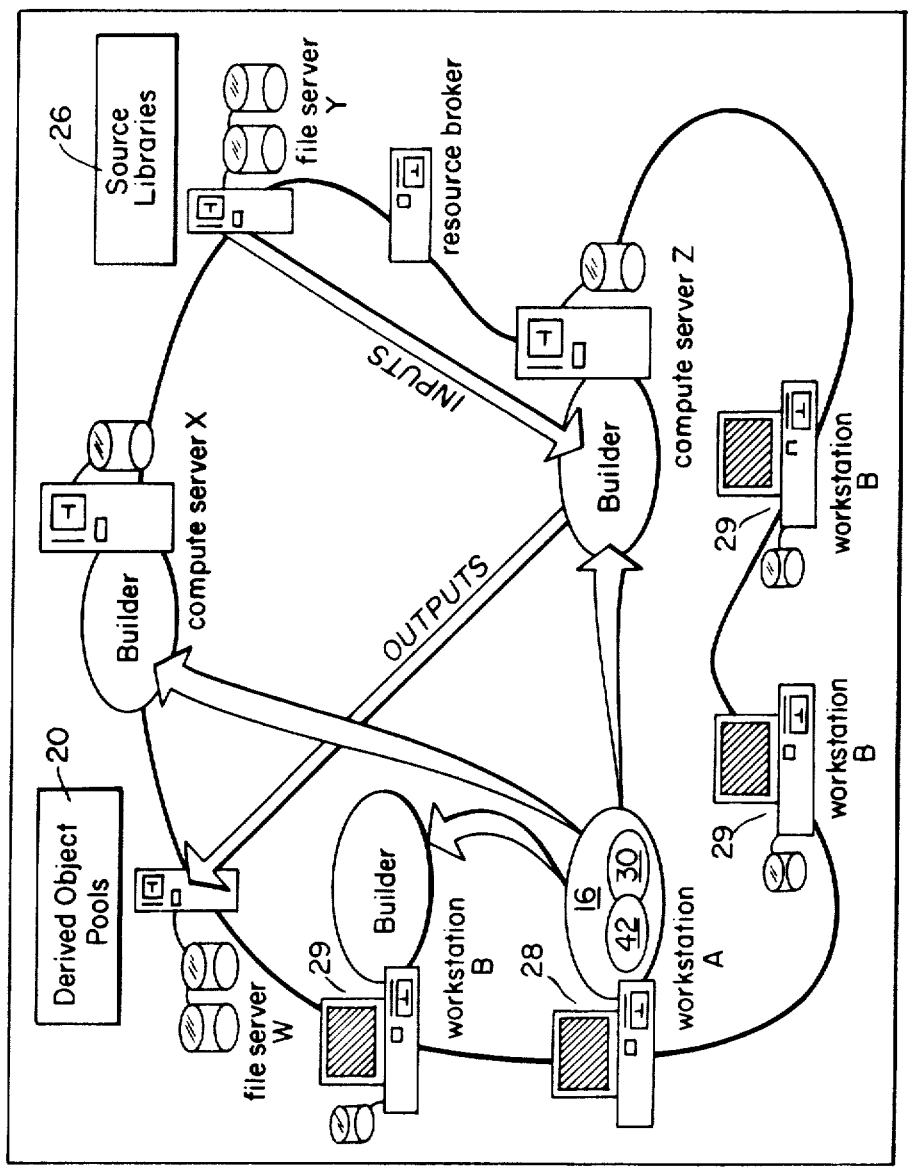
FIG. 2 is a schematic of a network of computers embodying the present invention.

As shown in FIG. 2, CASE tool 16 is utilized in the present invention within a network of loosely connected CPU's or workstations 28 and 29. Various workstations can utilize the CASE tool to concurrently build different systems or different versions of the same system. The derived object pool 20 of the CASE tool Configuration Manager 42, CM, is shared by all CPU's within the network. Thus, processors working on different components of the system use the same derived object pool and share common derived objects. Further, the CM 42 manages the derived object pool 20 in a way which allows multiple concurrent writers. Thus, many processors may write to pool 20 at the same time without creating inconsistent views of the pool.

The source libraries 26, which are controlled by the HM, are also shared among processors 28 and 29 of the network. Network-wide, transparent access to arbitrary versions of source elements in the source libraries 26 is provided by the underlying file system. This, in turn, enables software applications, such as compilers and test formatters, to read any version of a source element directly from the source library. By default, the latest version of an element is read. However, the per-process version map 24 of FIG. 1, generated by the CASE tool 16, can indicate an alternate version of the desired source element. The per-process nature of the version maps 24 enables simultaneous building of different versions of a system from the single set of sources. This ability to simultaneously access different versions of source elements is critical to the ability to build different configurations or system components in parallel.

For purposes of illustration in FIG. 2, the CASE tool 16 is invoked on one workstation 28. After the user of workstation 28 defines a system model and configuration thread, a desired version description is formed as previously mentioned. The CM 42 determines which system components need to be currently built (compiled) by looking in the derived object pool 20 for binaries which match the desired version description of each component. Once the CM 42 has determined which components of the system need to be built, the CM forms a translation script for each buildable component from translation rules in the system model. The translation script aids in the building of the component and provides directions for placing translator/compiler results in the derived object pool.

The CM 42 then utilizes a parallel build scheduler 30 within CASE tool 16 which commits builds to remote processors from workstation 28, as illustrated by the arrows extending from tool 16. Build scheduler 30 chooses a component from the buildable set, chooses a processor from an available set of processors, and assigns the building of the chosen component to the chosen processor. To accomplish this, the build scheduler 30 initially reads the dependency information of the components from a tree structure of the system model which defines a partial-ordering for building components in the model. The build scheduler 30 then creates from the system model tree an optimized ordering of only the buildable components and records the ordering in a linear scheduling structure. The linear scheduling structure is a condensed and flattened version of the system model tree structure, and employs a ready list of the buildable components with back pointers from each sub-component to its parent components. The tree structure of the system model is illustrated in FIG. 3a and an illustration of a corresponding linear scheduling structure of buildable components is provided in FIG. 3b.

Figure 3A:
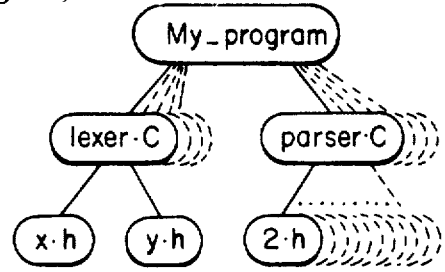
FIGS. 3a and 3b are schematics of the tree and linear structure used to order buildable components of a system compiled by the present invention.
Figure 3B:
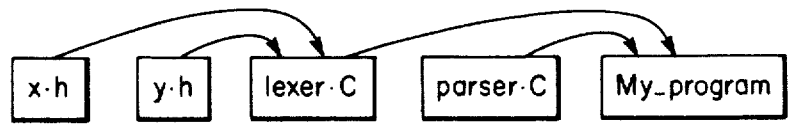

In FIG. 3a, components x.h and y.h are shown as subcomponents to the lexer.c component. Subcomponents x.h and y.h are shown as the bottom leaves of one branch of the whole system model tree and are independent from each other. Thus, x.h and y.h may be built in parallel without affecting the overall outcome of the system my_program. However, lexer.c depends on both x.h and y.h and thus cannot be built in parallel with either subcomponent. Similarly, 2.h is a sub-component of parser.c.

Assume for example that all of the illustrated components, except the 2.h component, are to be built. The build scheduler 30 would then create the linear scheduling structure illustrated in FIG. 3b.

The build scheduler 30 also initially creates an ordered list of user specified processors (i.e., workstations), the names and ordering of which the user provides the CASE tool 16 in a file within the network. In a preferred embodiment, the list is as long as the user desires, but only twenty processors are concurrently used to build any one system. Preferably the list is ordered in a preference of more powerful to least based on the number of million instructions per second the processor executes. For the compilation of each component, the build scheduler 30 chooses the most powerful listed processor available with a sufficient amount of idle time, as will be defined. This maximizes performance of the network and parallel building scheme, and minimizes the amount of interference with other users of the network on their workstations.

Figure 4:
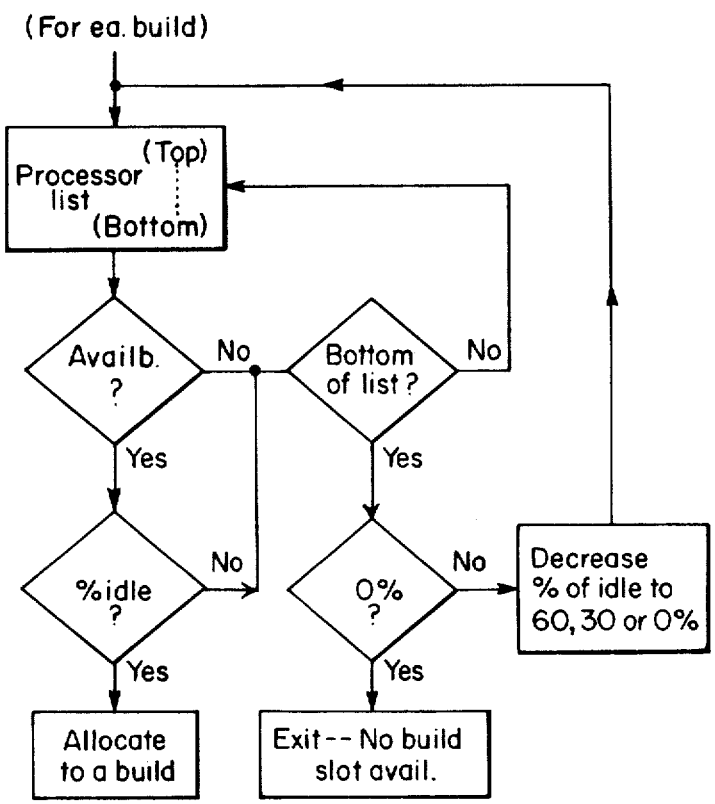
FIG. 4 is a flow chart of the allocation of a processor of the network in the present invention.

As illustrated by the flow chart of FIG. 4, for each buildable component, the build scheduler 30 starts at the beginning of the list of processors and determines if the first named processor is available and 90% or more idle. If it is, then the build scheduler assigns that processor the task of compiling the next component on the ordered list of buildable components. The processor is then marked as unavailable, and the build scheduler continues in the same manner beginning at the top of the list of processors for the next buildable component. By starting at the top of the list each time, the build scheduler 30 will grab the most powerful processor as it becomes available. If the processor is not 90% or more idle, then the build scheduler 30 determines if the next available processor on the list is 90% or more idle, and so on. If the build scheduler exhausts the list of processors, then the build scheduler starts at the top of the list and determines if any processor is available and 60% or more idle, then 30% and so on after each exhaustion of the list.

Idle time, I, is defined by:

$$I = \frac{N - N_o}{R - R_o}$$

where N is current null process time of a processor and $N_o$ is a base null process time of the processor, R is the current real time, and $R_o$ is the real time at which the base null process time was obtained. During the initialization stage of the build scheduler, the build scheduler samples each of the listed processors for a null processing time which is the amount of time that no process was using the CPU during a certain time segment. The real times of the sampling of each listed processor is also obtained and recorded with the respective null process times. When the build scheduler subsequently determines which processor is best suited for compiling a component, a current null process time and a current real time is obtained for each processor as the scheduler proceeds down the processor list. The last obtained null process time and real time becomes the base null process time and base real time during a subsequent evaluation for idle time of a processor. This ensures that the next sampling of idle time is over a most recent time period of activity instead of over a time period of activity which was already sampled and has a known idle time. In the preferred embodiment, the samplings of idle time are minimally about 10 seconds apart from each other.

After assigning the "best" processor to compile one component, the next buildable component is similarly assigned to the next determined "best" available processor and so forth such that components are compiled in parallel on different processors of the network. In order for each duly chosen processor to compile the respectively assigned component, the CM creates a new process or task on each chosen processor. This includes providing the translation script and a version map of each component to the respective processor. The version map specifies to the processor the desired versions of source elements for that component. Each processor is capable of accessing a file system or compiler of another processor in order to compile the desired version of the assigned component.

Further, a common root is established for all processors. Otherwise, various inconsistencies would arise where the buildable components depend on local files and the various processors have different local file systems. The present invention solves this problem by extending the UNIX ® chroot(2) facility to allow the root of a local file system to resolve to the root of a remote file system. The common root is specified by the user in a separate command at the time of the initialization of the build scheduler 30. Any one file system or workstation in the network may be designated as a reference for the compiling of all the various components on the several different processors.

An additional complication results from the fact that CASE tool 16 records the version of all sources and tools that are used in a translation of a component. Since the sources and tools used are from the reference workstation, CASE tool 16 sets its own root to the reference workstation prior to determining the versions of the source elements.

Once a chosen remote processor begins executing the respective translation script in the specially prepared process environment, the CM similarly starts additional processes on other processors. Output compilation status messages from each processor are directed to different respective temporary files. The CM services these messages and records the completion status of the processor after determining if the build failed or succeeded. Once a process has terminated, the CM copies the output messages from the respective temporary file, changes the indication of the availability of the processor, and displays the output messages locally to the workstation 28 which invoked the CASE tool. The completion status is also displayed. Further, a continuously updated graphics display of the current status of the overall parallel build of the system is provided separate from the display of output messages.

An illustration of these displays is provided in FIG. 5. On the left hand section 34 of the screen 32, the user reads output compilation status messages of each processor, one set of messages from one processor at a time. On the right hand section 36 of the screen 32, the user reads an overall status report of the parallel building of the requested system. The overall status report includes, the total number of builds (compilations) required to build the system, the number of builds pending, the number of builds successfully and unsuccessfully completed, and the number of builds in progress.

If the various output messages were directly displayed at workstation 28 as the processors compiled components in parallel, the screen would display the output messages in a tangled, mixed-up order. That is, the messages of one processor would be intermixed with that of the other processors. Further, the overall status report is totally separated from the other messages for ease in reading by the user.

Further, the CM periodically polls each remote processor to determine that it has not abnormally terminated. In a case of abnormal termination of the remote build process or compilation, the CM recovers with an error message indicating that the build was lost and frees the processor for another assignment. This ensures a more efficient use of the processors in the network instead of waiting indefinitely for the remote process to send a completion message.

Figure 6:
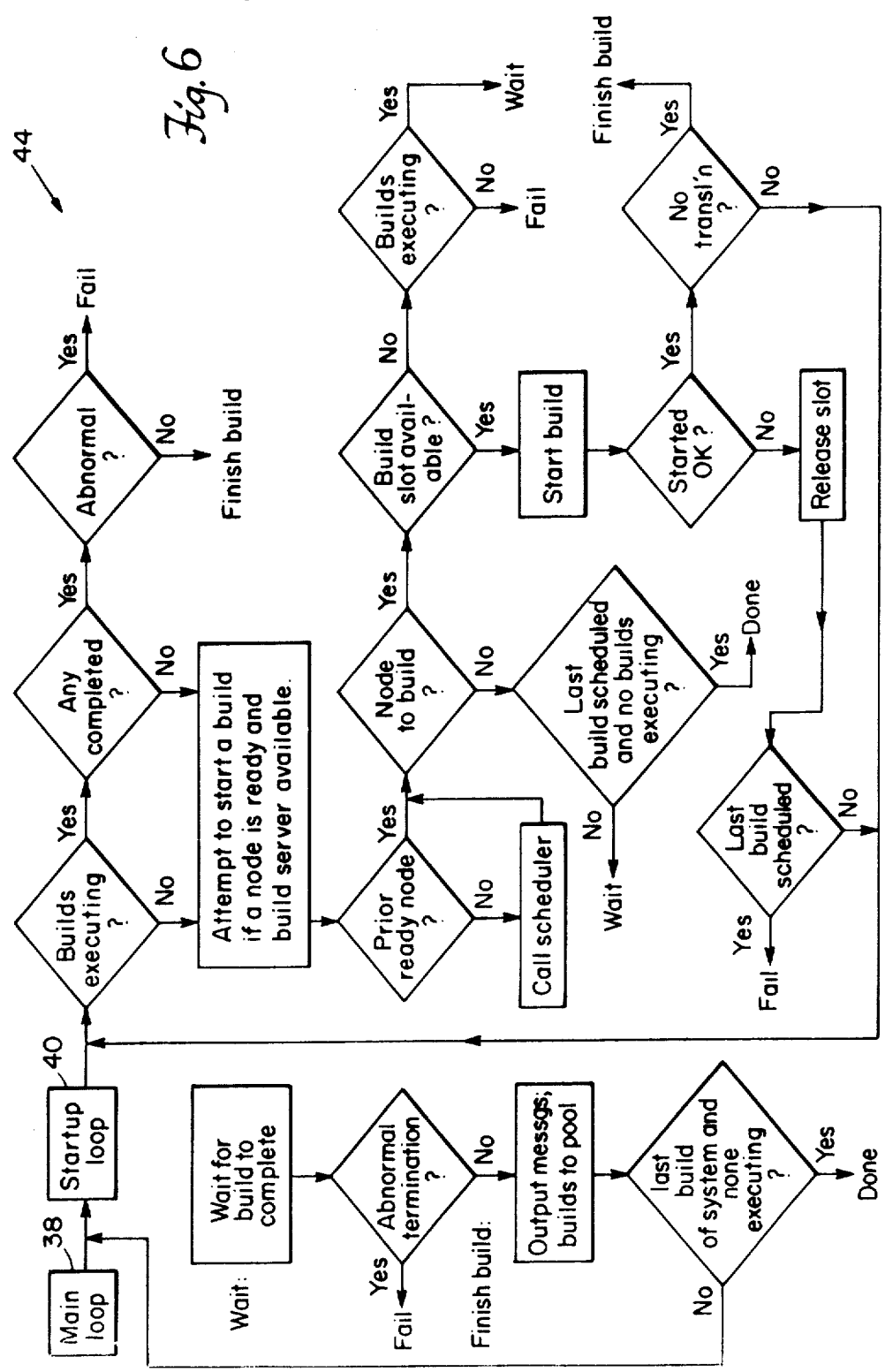
FIG. 6 is a flow chart of the major program module used to implement the present invention.

The following describes the computer subroutine 44 used to implement the above discussed concurrent building of system components for one system. A block diagram of the subroutine 44 is provided in FIG. 6.

Upon entry to the subroutine 44, the build scheduler initializes the list of buildable components and the ordered list of user-specified processors. The buildable components are ordered in a linear scheduling structure according to dependency as previously described in FIGS. 3a and 3b. Initial samples of a base null process time and a base real time are obtained for the listed processors as previously described. Also, upon entry to the subroutine, a user-specified reference file system is established.

A main loop 38 comprises a startup loop 40, which starts as many builds (compilations) as possible under the constraints of:

(1) the implementation maximum number of concurrent builds;
(2) the number of available processors;
(3) the user-defined limit on the number of concurrent builds; and
(4) the dependency of some builds on the successful completion of other builds.

Before starting a new build, startup loop 40 checks executing builds for completion. If the build was abnormally terminated, then the rest of the builds not yet completed are aborted and a fail message is displayed. If the build terminated normally, then subroutine "finish build" is invoked as will be described.

If no builds are completed, then the starting of another new build is attempted. An examination is made for any buildable component remaining from a previous call to the "build scheduler," a routine which schedules the builds in order of dependency. If there is no outstanding buildable component, then the build scheduling routine is invoked to obtain the next buildable component.

If there are no more buildable components that can be obtained by the build scheduling routine and all builds have been completed (i.e. the last build was scheduled and no builds are executing), then finalization is accomplished by the subroutine "Done" as will be discussed. If no other builds can be assigned right now due to dependencies of the builds, then startup loop 40 is exited to main loop 38 where main subroutine 44 waits for a build to complete.

Once a buildable component has been obtained, the subroutine described in FIG. 4 is invoked to allocate the best processor or build slot available. If no slot is available, then an error check is made. If no builds are being executed, then the finding of no build slot available is an error which is handled by the "Fail" subroutine. Otherwise, the finding of no build slot available right now is legitimate and startup loop 40 is exited to main loop 38 to wait for a build to complete.

If a build slot is found, then a new build is started. If the build was started without error and is presently executing, then the startup loop is begun again to attempt to start a new build. However, if the build that was started without error has no translation script, then it may be completed immediately. Thus, subroutine "finish build" is invoked.

If a build could not be started due to an error, then the build slot is released and the build scheduler is updated. If this was the last build of the system, then subroutine "Fail" is invoked. Otherwise, startup loop 40 is repeated to try to start another build.

An alternative in the case of a build not being able to be started, is to exit the startup loop and see if a build has finished. This would perhaps avoid another false start if the problem with starting the build involved the unavailability of resources due to builds which have been completed but not yet "cleaned up" (i.e., finalized). However, in the previously described embodiment of FIG. 2, such a problem should not arise.

The startup loop 40 is repeated continually as described above until either a build with no translation script is started (which means that the build can be finished immediately), or the last build that can currently be executed is started. That build is the last possible build to execute due to either all processors being in use or no other component of the system being "independent" enough to currently be built. If the build has no translation rule, then the build is completed via the "finish build" subroutine. If the build has a translation script, then the main subroutine 44 waits for a build to complete in main loop 38. Once a build has completed, error checking is provided for abnormal termination of the build. If the build was abnormally terminated, then the subroutine "Fail" is invoked. If the build was normally terminated, then subroutine "finish build" is invoked. "Finish build" finalizes output messages concerning the success or failure of the build and updates the build scheduler. If the compilation was successful, then "finish build" places the completed build in the common derived objects pool along with the version description used in the build. If the compilation was unsuccessful, then "finish build" withholds the build from the pool.

If that build was the last build for the system and all other builds have come to completion, then the "Done" subroutine is invoked. Otherwise, the main loop 38 of subroutine 44 is begun again and retraced along with inner startup loop 40.

Subroutine "Done" first tests the status of the listed last component to be built. If the status indicates that the component must still be built, then the build command invoking this main subroutine 44 failed. Significant error statistics are outputted to a display and the build scheduler is terminated. This ends subroutine 44.

Subroutine "Fail" similarly ends the main subroutine 44 by outputting any significant error statistics to a display and terminating the build scheduler. However, before ending the subroutine 44, "Fail" terminates all builds which may be executing and clears their respective files of status messages.

While the invention has been particularly shown and described with reference to a preferred embodiment thereof, it will be understood by those skilled in the art that various changes in form and details may be made therein without departing from the spirit and scope of the invention as defined by the appended claims.

We claim:

1. Apparatus for managing computer software comprising:
 a plurality of processors loosely connected in a network; and
 configuration management means, executable on at least one of the processors, for building from a configuration model a desired software system having a multiplicity of components including independent components, the configuration management means determining which components are to be compiled and assigning each such to-be-compiled component to a processor to compile the component, the configuration management means assigning the independent components to different processors such that components in the desired software system which are independent of each other are automatically compiled in parallel by different processors to minimize total compilation time of the desired software system;
 the components of the desired software system being of user designated versions.

2. Apparatus as claimed in claim 1 further comprising a common pool of compiled components, the configuration management means determining which components of the system have corresponding compiled components in the common pool such that components of the system without corresponding compiled components in the common pool are determined to be compiled by processors of the network.

3. Apparatus as claimed in claim 1 wherein:
 each processor has a local file system; and
 the configuration management means comprises means for establishing the file system of a user specified processor within the network as a reference file system to be resolved to by the other processors for compiling respective assigned components.

4. Apparatus as claimed in claim 1 wherein the configuration management means builds from different configuration models different software systems and includes a build scheduler which for each system:
 orders the to-be-compiled components according to their dependencies on each other, independent components taking precedence over dependent components; and
 chooses and assigns available processors to compile, in order, the to-be-compiled components.

5. Apparatus as claimed in claim 4 further comprising a user specified list of a subset of the processors, the list ordered from most powerful to least powerful processor, the build scheduler choosing from the list the most powerful available processor with sufficient idle time and assigning that processor to compile a component.

6. Apparatus as claimed in claim 5 wherein the build scheduler computes the idle time of each listed processor as a ratio of the difference between current idle time and a base idle time to the difference between current real time and a base real time.

7. Apparatus as claimed in claim 6 wherein for each listed processor the build scheduler computes an initial base real time and an initial base idle time before any to-be-compiled component of the system is compiled and thereafter obtains a sample of a current real time and current idle time of each listed processor when choosing a processor to compile a component.

8. Apparatus as claimed in claim 6 wherein the build scheduler obtains an initial base real time and an initial base idle time for all the listed processors at one time and obtains subsequent samples of current real time and current idle time for the processors, one processor at a time in decreasing list order.

9. Apparatus as claimed in claim 1 further comprising:
 a user specified list of a subset of the processors; and a build scheduler which chooses from the list the most powerful processor with sufficient idle time and assigning that processor to compile a component.

10. Apparatus as claimed in claim 1 further comprising display means which separates compilation status messages relative to each of the compilations carried out by different processors and only displays status messages from a particular compilation on termination of the compilation.

11. Apparatus as claimed in claim 10 wherein the display means includes a separate output file associated with each compilation.

12. Apparatus as claimed in claim 10 wherein said display means further displays an indication of a current overall status of the system being built, said current status indication being displayed separately from the compilation status messages and continuously being updated by the completion and commencement of compilations by the processors.

13. Apparatus as claimed in claim 12 wherein the indication of the current overall status includes indications of a number of pending compilations, a number of unsuccessful compilations, a number of successfully completed compilations, a number of compilations in progress and a total number of compilations required to build the system 14. Apparatus as claimed in claim 1 wherein a compiler stored in a file system of one processor is invoked by other processors of the network.

15. Apparatus for managing computer software comprising:
a plurality of processors capable of processing compilations of software components, one of said processors having a compiler within a certain local file system, the one processor being defined as a reference processor for the other processors, such that each of the other processors makes reference to the certain local file system of the one processor to compile a respective component, the processors compiling respective components in parallel while making reference to the certain local file system of the reference processor.

16. Apparatus as claimed in claim 15 wherein said processors compile in parallel different components of a system such that total compilation time for the system is minimized.

17. Apparatus for managing computer software comprising:
a plurality of processors, each processor having access to files of the other processors;
configuration management means for automatically compiling components of a software system in parallel utilizing the processors, the compiling in parallel minimizing total compilation time of the components of the software system, said means having:
means for evaluating idle status of the processors, the evaluating means providing an idle status evaluation;
a scheduler for selecting a processor for a compilation based on the idle status evaluation; and
means for specifying to the selected processor a processor from whose files a compiler is to be used for the compilation.

18. Apparatus as claimed in claim 17 wherein said means for evaluating idle status includes a computing member which determines idle status from a ratio of the difference between current idle time and a base idle time to the difference between current real time and a base real time.

19. Apparatus as claimed in claim 17 wherein the scheduler of the configuration management means selects a processor further based on power of the processors.

20. Apparatus as claimed in claim 17 wherein the scheduler of the configuration management means selects a processor in such a manner that the most powerful processor recently made available is selected.

21. Apparatus as claimed in claim 17 further comprising display means which separates compilation status messages relative to each of the compilations carried out by different processors and only displays status messages from a particular compilation on termination of the compilation.

22. A computer display comprising:
a first screen section displaying compilation status messages from different processors compiling in parallel different modules of a desired software system for parallel building of the system, compilation status messages of each compilation by each processor being displayed independently of messages of other compilations; and
a second screen section displaying a summary of a current overall status of the parallel building of the system including status of compilations associated with the processors, the first and second screen sections being displayed simultaneously.

23. A computer display as claimed in claim 22 wherein the first screen section only displays compilation status messages of a particular compilation upon termination of that compilation.

24. A computer display as claimed in claim 22 wherein the second screen section is continuously updated.

25. Method of building a software system using computer means comprising the steps of:
providing a plurality of processors loosely connected in a network; and
executing configuration management means on one of the processors, the configuration management means building from a configuration model a software system having a multiplicity of components including independent components, the configuration management means determining which components of the software system are to be currently compiled and assigning each to-be-compiled component to a processor for compiling, the configuration management means assigning independent components to different processors such that components of the software system are automatically compiled in parallel by different processors to minimize total compilation time for the software system, version of each component being user specified in the configuration model.

26. A method as claimed in claim 25 wherein the configuration management means determining which components are to be compiled includes:
matching compiled components from a common pool of previously derived components with components of the system, unmatched components of the system being established as the components to be currently compiled.

27. A method as claimed in claim 25 wherein the configuration management means determining and assigning includes:

ordering the to-be-compiled components according to their dependencies on each other, independent components taking precedence; and choosing and assigning available processors to compile, in order, the to-be-compiled components.

28. A method as claimed in claim 27 wherein the step of choosing and assigning an available processor includes:

ordering a list of a subset of the processors, the list ordered from most powerful to least powerful processor; and choosing from the list the most powerful available processor with sufficient idle time; and assigning the chosen processor to compile the next to-be-compiled component.

29. A method as claimed in claim 25 further comprising the step of defining one processor as a reference processor for the other processors.

30. In a digital processing system, a method of building a software system having a multiplicity of components, the steps comprising:

providing a plurality of processors coupled to form a network;

providing a compiler in local memory of one of the processors, the other processors having access to the compiler; and executing configuration management means on one of the processors, the configuration management means assigning different components of the software system to different processors of the network to compile the components referring to the compiler of the one processor, the processors compiling respectively assigned components in parallel to minimize total compilation time of the software system.

31. In a network of computer processors, a method of displaying through one processor a multiplicity of compilation status messages from different processors in the network comprising the steps of:

using computer means, collecting the messages of each compilation of each processor separately from that of other compilations, the processors compiling, in parallel, modules of a software system to minimize total compilation time of the system; and using a display driver of the one processor, displaying the messages of a compilation only on termination of that compilation.

* * * * *